(12) United States Patent
Hong et al.

(10) Patent No.: US 7,057,850 B2
(45) Date of Patent: Jun. 6, 2006

(54) FLOW DIVIDER UPSTREAM OF DISC DRIVE RECIRCULATION FILTER

(75) Inventors: Yiren Hong, Singapore (SG); ChoonKiat Lim, Singapore (SG); James H. Smith, Woodside, CA (US); Walter Wong, Boulder, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 425 days.

(21) Appl. No.: 10/186,952

(22) Filed: Jun. 28, 2002

(65) Prior Publication Data

US 2003/0197974 A1 Oct. 23, 2003

Related U.S. Application Data

(60) Provisional application No. 60/373,810, filed on Apr. 19, 2002.

(51) Int. Cl.
*G11B 33/14* (2006.01)

(52) U.S. Cl. .................................................. 360/97.02
(58) Field of Classification Search .............. 360/97.01, 360/97.02, 97.03; 720/648
See application file for complete search history.

(56) References Cited

U.S. PATENT DOCUMENTS

| | | | | |
|---|---|---|---|---|
| 4,581,668 A | * | 4/1986 | Campbell | 369/72 |
| 4,710,830 A | | 12/1987 | Imai et al. | 360/97 |
| 4,714,972 A | * | 12/1987 | Biermeier et al. | 360/97.03 |
| 4,857,087 A | | 8/1989 | Bolton et al. | 55/385.6 |
| 5,012,365 A | * | 4/1991 | Yokoyama | 360/97.03 |
| 5,034,835 A | * | 7/1991 | Yokoyama | 360/97.02 |
| 5,696,649 A | * | 12/1997 | Boutaghou | 360/97.03 |
| 5,995,323 A | * | 11/1999 | Jinbo et al. | 360/97.02 |
| 6,008,965 A | | 12/1999 | Izumi et al. | 360/97.03 |
| 6,266,208 B1 | | 7/2001 | Voights | 360/97.02 |
| 6,362,937 B1 | * | 3/2002 | Gibbs et al. | 360/256.1 |
| 6,594,108 B1 | * | 7/2003 | Naganathan et al. | 360/97.02 |
| 6,654,201 B1 | * | 11/2003 | Smith | 360/97.02 |

FOREIGN PATENT DOCUMENTS

| | | | | |
|---|---|---|---|---|
| JP | 62076089 A | * | 4/1987 | |
| JP | 62088195 A | * | 4/1987 | |
| JP | 62298076 A | * | 12/1987 | |
| JP | 01092987 A | * | 4/1989 | |
| JP | 02226577 A | * | 9/1990 | |
| JP | 03054791 A | * | 3/1991 | |
| JP | 03063991 A | * | 3/1991 | |
| JP | 03216887 A | * | 9/1991 | |
| JP | 05062451 A | * | 3/1993 | |
| JP | 05266648 A | * | 10/1993 | |
| JP | 08321170 A | * | 12/1996 | |
| JP | 2000228078 A | * | 8/2000 | |

\* cited by examiner

*Primary Examiner*—William J Klimowicz
(74) *Attorney, Agent, or Firm*—Shumaker & Sieffert, PA

(57) ABSTRACT

A disc drive includes a housing enclosing a spindle motor that is able to spin a disc. A filter within the housing is positioned so that a filter stream of moving gas created by a spinning motion of the disc flows through the filter. Additionally, a flow divider is secured to a portion of the housing and positioned within the filter stream upstream of the filter, splitting the filter stream into a first branch and a second branch. Both branches flow through the filter.

29 Claims, 5 Drawing Sheets

FLOW DIVIDER UPSTREAM OF DISC DRIVE RECIRCULATION FILTER

RELATED APPLICATIONS

This application claims priority of U.S. provisional application Ser. No. 60/373,810, filed Apr. 19, 2002.

FIELD OF THE INVENTION

This application relates generally to disc drives and more particularly to a flow divider upstream of a disc drive recirculation filter entrance.

BACKGROUND OF THE INVENTION

A typical disc drive includes a base to which various components of the disc drive are mounted. A top cover cooperates with the base to form a housing that defines an internal, sealed environment for the disc drive. The components include a spindle motor, which rotates one or more discs at a high speed. Information is written to and read from tracks on the discs through the use of an actuator assembly, which rotates during a seek operation about a bearing shaft assembly positioned adjacent the discs. The actuator assembly includes at least one actuator arm, which extends towards the discs, with one or more flexures extending from each of the actuator arms. Mounted at the distal end of each of the flexures is a head, which includes an air bearing slider enabling the head to fly in close proximity above the corresponding surface of the associated disc.

Particles in the disc drive have an adverse effect on reliability. Of particular concern are airborne particles that enter the head-disc interface. These particles can scratch the disc surface or become embedded in the disc, leading to catastrophic failures and/or irrecoverable data loss. Additionally, particles under the slider can damage the sensitive head transducer and possibly prevent any further read/write operations of the disc drive. Many disc drives include a recirculation filter within the sealed environment adjacent the discs. The filter traps particles carried by wind passing through the filter and reduces the number of particles within the sealed environment.

Accordingly there is a need for a disc drive that improves recirculation filter performance. The present invention provides a solution to this and other problems, and offers other advantages over the prior art.

SUMMARY OF THE INVENTION

Against this backdrop the present invention has been developed. A disc drive according to an embodiment of the present invention includes a housing enclosing a spindle motor that is able to spin a disc. A filter within the housing is positioned so that a filter stream of moving gas created by a spinning motion of the disc flows through the filter. Additionally, a flow divider is secured to a portion of the housing and positioned within the filter stream upstream of the filter, splitting the filter stream into a first branch and a second branch. Both branches flow through the filter.

Stated another way, a disc drive according to an embodiment of the present invention includes a housing having a base and a top cover secured to the base. The housing encloses a spindle motor spinning a disc. A filter within the housing adjacent the disc is positioned so that a gaseous filter stream created by the spinning disc flows through the filter. Additionally, a first vane is secured to a portion of the housing and positioned within the filter stream upstream of the filter. The first vane splits the filter stream into a first branch and a second branch, both flowing through the filter. A first flow rate of the first branch is substantially the same as a second flow rate of the second branch.

These and various other features as well as advantages which characterize the present invention will be apparent from a reading of the following detailed description and a review of the associated drawings.

DETAILED DESCRIPTION

Figure 1:
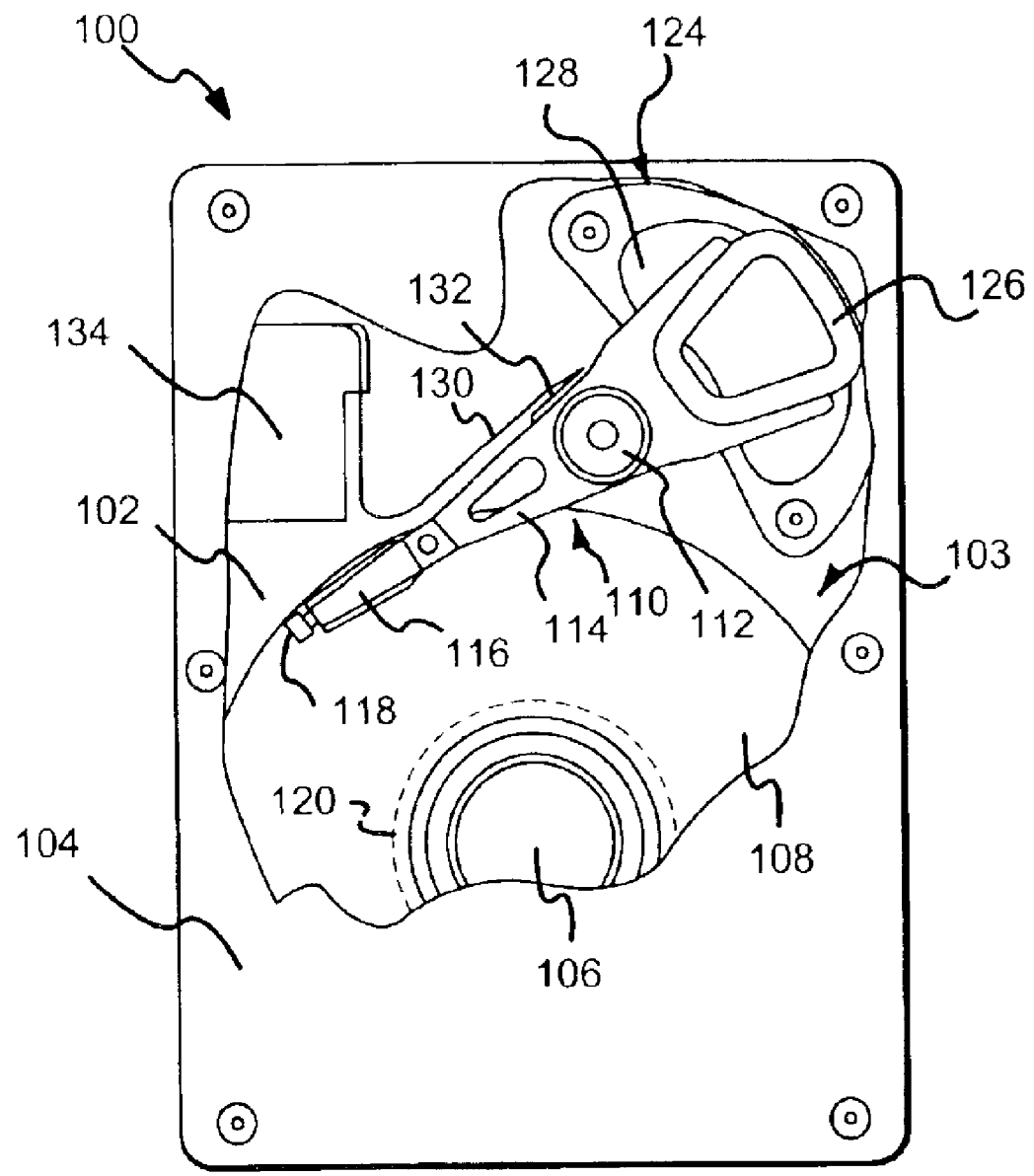
FIG. 1 is a top plan view of a disc drive incorporating a preferred embodiment of the present invention showing the primary internal components.

A disc drive 100 constructed in accordance with a preferred embodiment of the present invention is shown in FIG. 1. The disc drive 100 includes a substantially rectangular base 102 to which various components of the disc drive 100 are mounted. A top cover 104, shown partially cut away, cooperates with the base 102 to form a housing 103 that encloses an internal, sealed environment for the disc drive in a conventional manner. The components include a spindle motor 106, which rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118, which includes an air bearing slider enabling the head 118 to fly in close proximity above the corresponding surface of the associated disc 108.

During a seek operation, the track position of the heads 118 is controlled through the use of a voice coil motor 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112, and the heads 118 are caused to move across the surfaces of the discs 108.

The spindle motor 106 is typically de-energized when the disc drive 100 is not in use for extended periods of time. The heads 118 are moved over park zones 120 near the inner diameter of the discs 108 when the drive motor is de-energized. The heads 118 are secured over the park zones 120 through the use of an actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Figure 2:
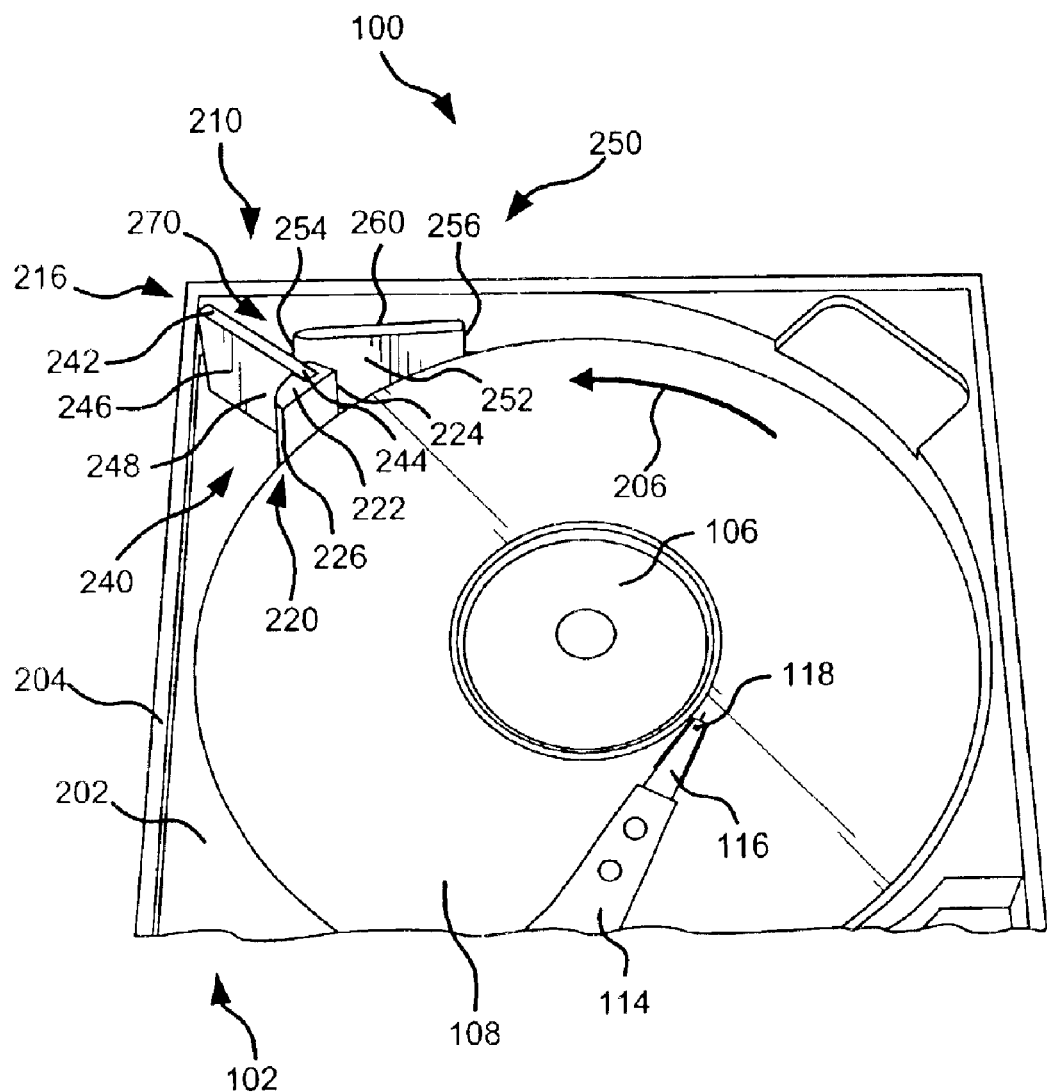
FIG. 2 is a perspective cut away view of the disc drive of FIG. 1 with the top cover removed.
Figure 3:
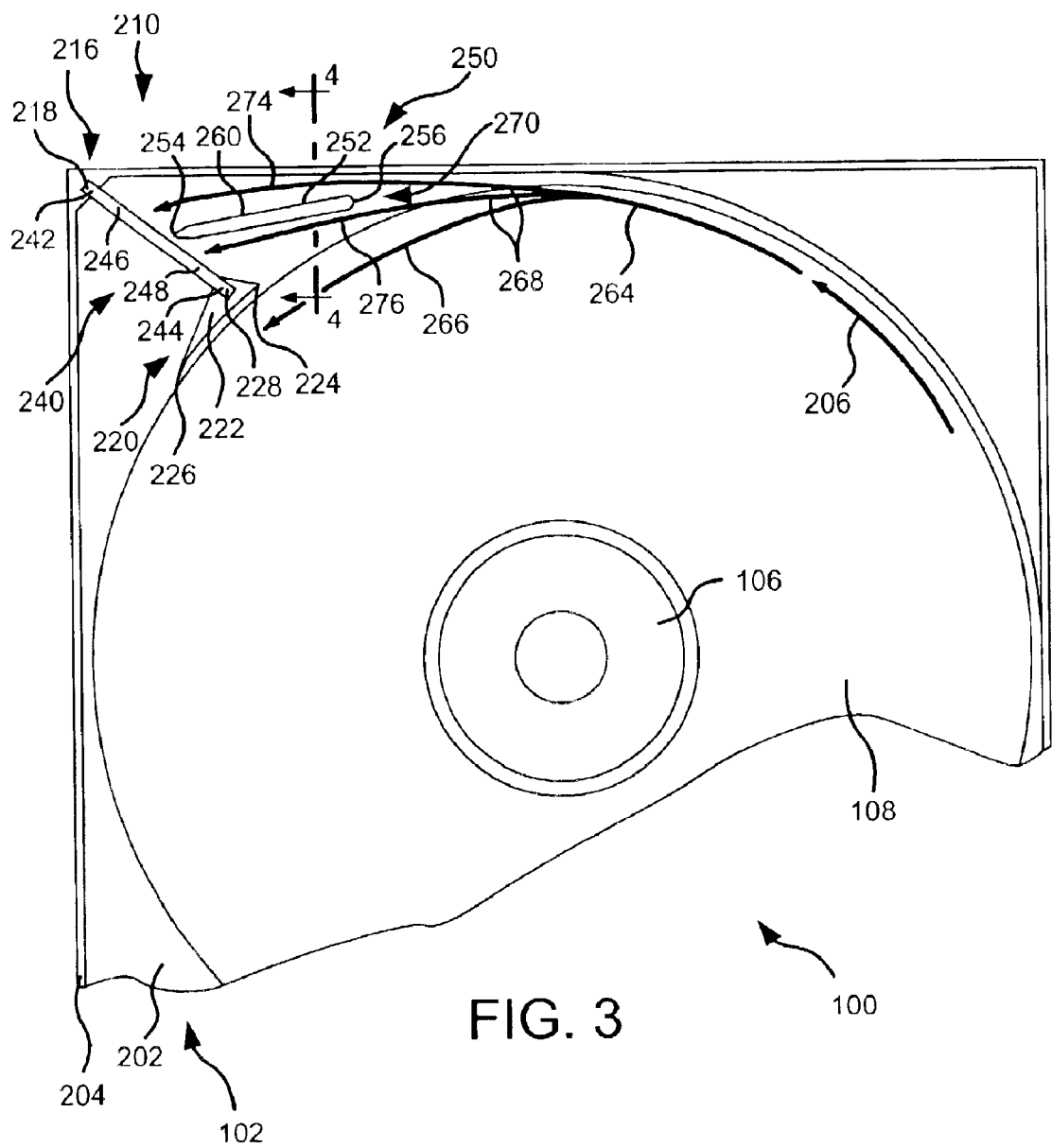
FIG. 3 is a cut away top plan view of the disc drive of FIG. 2.

FIGS. 2–3 illustrate a cut-away portion of the disc drive 100 without the top cover 104. The base 102 of the disc drive 100 includes a bottom plate 202 and a continuous outer wall 204 extending up from the periphery of the bottom plate 202 (see FIG. 4). The discs 108 rotate in a counterclockwise direction as viewed in FIGS. 2–3 and create a wind that also generally travels in a counterclockwise wind direction 206, although the wind typically includes a centrifugal force component that biases the wind in a radial direction and produces a small radial component of the wind direction 206. The wind may be air or some other gas residing within the disc drive 100.

A filter assembly 210 is located between the discs 108 and a corner of the base 102 opposite the flex bracket 134 (see FIG. 1). The filter assembly 210 includes an outer filter support 216 that is preferably integrally formed with the corner of the outer wall 204 of the base 102. The filter support 216 defines a vertically extending outer filter support groove 218 (FIG. 3) that opens inwardly toward the discs 108. An inner filter support 220 is preferably integrally formed with the base 102 and extends upward from the bottom plate 202 adjacent the discs 108. The inner filter support 220 has a top surface 222, which may abut the top cover 104. The inner filter support 220 also has a vertically extending leading edge (i.e., upstream edge) 224 and an opposing trailing edge (i.e., downstream edge) 226. The inner filter support 220 defines a vertically-extending inner filter support groove 228 (FIG. 3) between the leading edge 224 and the trailing edge 226 that opens outwardly toward the outer filter support 216.

A filter 240 preferably includes a single filter element that extends between the outer filter support 216 and the inner filter support 220. However, the filter 240 could include multiple filter elements. An outer end 242 of the filter 240 is seated in the outer filter support groove 218, and an inner end 244 of the filter 240 is seated in the inner filter support groove 228 so that the filter 240 extends in a substantially radial direction relative to the spinning discs 108. The filter 250 is divided into an outer filter zone 246 and an inner filter zone 248 by a flow divider 250. The two filter zones 246, 248 preferably cover about the same amount of filter area of the filter 240.

Figure 4:
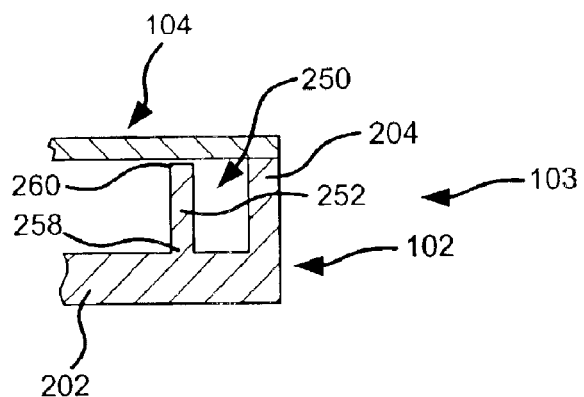
FIG. 4 is a sectional view taken along line 4—4 of FIG. 3, but additionally showing the top cover of the disc drive.

The flow divider 250 includes a substantially rectangular vane 252 that has a vertical trailing edge 254 adjacent the filter 240 that separates the outer filter zone 246 from the inner filter zone 248. The vane 252 extends upstream from the trailing edge 254 to a leading edge 256. The trailing edge 254 and the leading edge 256 are both preferably rounded. Referring to FIG. 4, a base or bottom edge 258 of the vane 252 is secured to the bottom plate 202 of the base 102, and the vane 252 extends upwardly from the bottom plate 202 to a top edge 260 that is preferably positioned adjacent the top cover 104. The top edge 260 may actually abut the top cover 104 or it may be located substantially below the top cover. However, most preferably the top edge 260 of the vane 252 is adjacent the top cover 104, leaving a small gap between the top cover 104 and the top edge 260 so that the top edge 260 does not interfere with the top cover 104. Notably, the vane 252 could be secured to the top cover 104, rather than the base 102. Referring back to FIGS. 2–3, the vane 252 is illustrated as being substantially planar, but it is preferably curved as needed to properly redirect gaseous flow to the filter 240. Also, the leading edge 256 of the vane 252 is preferably positioned so that the flow rates through the outer filter zone 246 and the inner filter zone 248 are substantially the same.

The vane 252 is preferably integrally formed with the base 102 so that the base 102 and the vane 252 form a single unitary member. In a preferred embodiment, the unitary member is a cast aluminum member, which may be an aluminum alloy, such as a high silicon alloy. The vane 252 is preferably as thin as is practical, considering practical manufacturing concerns.

Referring to FIG. 3, as a main wind stream 264 created by the spinning discs 108 approaches the filter assembly 210, the flow splits into a pass-by stream 266 that flows substantially circularly inside the filter assembly 210 and thus does not flow through the filter 240, and a filter stream 268 that flows substantially tangentially into a filter channel 270 defined between the outer wall 204 of the base 102 and the inner filter support 220. The filter stream 268 then flows through the filter 240 and the filter 240 traps particles that are carried by the filter stream 268, thereby reducing the number of particles within the disc drive 100. In many previous disc drives, the filter stream formed a vortex upstream of the filter, which reduced the flow rate of the filter stream. If less gas flows through the filter, then the filter will trap fewer particles. Thus, the upstream vortex hindered the performance of the filter.

The vane 252 splits the filter stream 268 into an outer branch 274 and an inner branch 276 and separates the outer branch 274 from the inner branch 276, preferably until the branches 274 and 276 enter the filter 240. The outer branch 274 thus flows through the outer filter zone 246 and the inner branch 276 flows through the inner filter zone 248. It is believed that splitting the filter stream 268 into two narrower branches 274 and 276 either prevents upstream vortices from forming or allows only smaller vortices that do not hinder flow through the filter 240 as much as would a single large vortex. The flow divider 250 thus enhances the performance of the filter 240 by increasing the flow through the filter. This conclusion is supported by tests that measured pressure drop across the filter 240 (the difference between the pressure immediately upstream of the filter 240 and the pressure immediately downstream of the filter 240). A greater pressure drop indicates a greater flow rate through the filter. The disc drive 100 with the flow divider 250 had a fifteen percent greater filter pressure drop than a disc drive having the same overall design, but without the flow divider 250.

Figure 5:
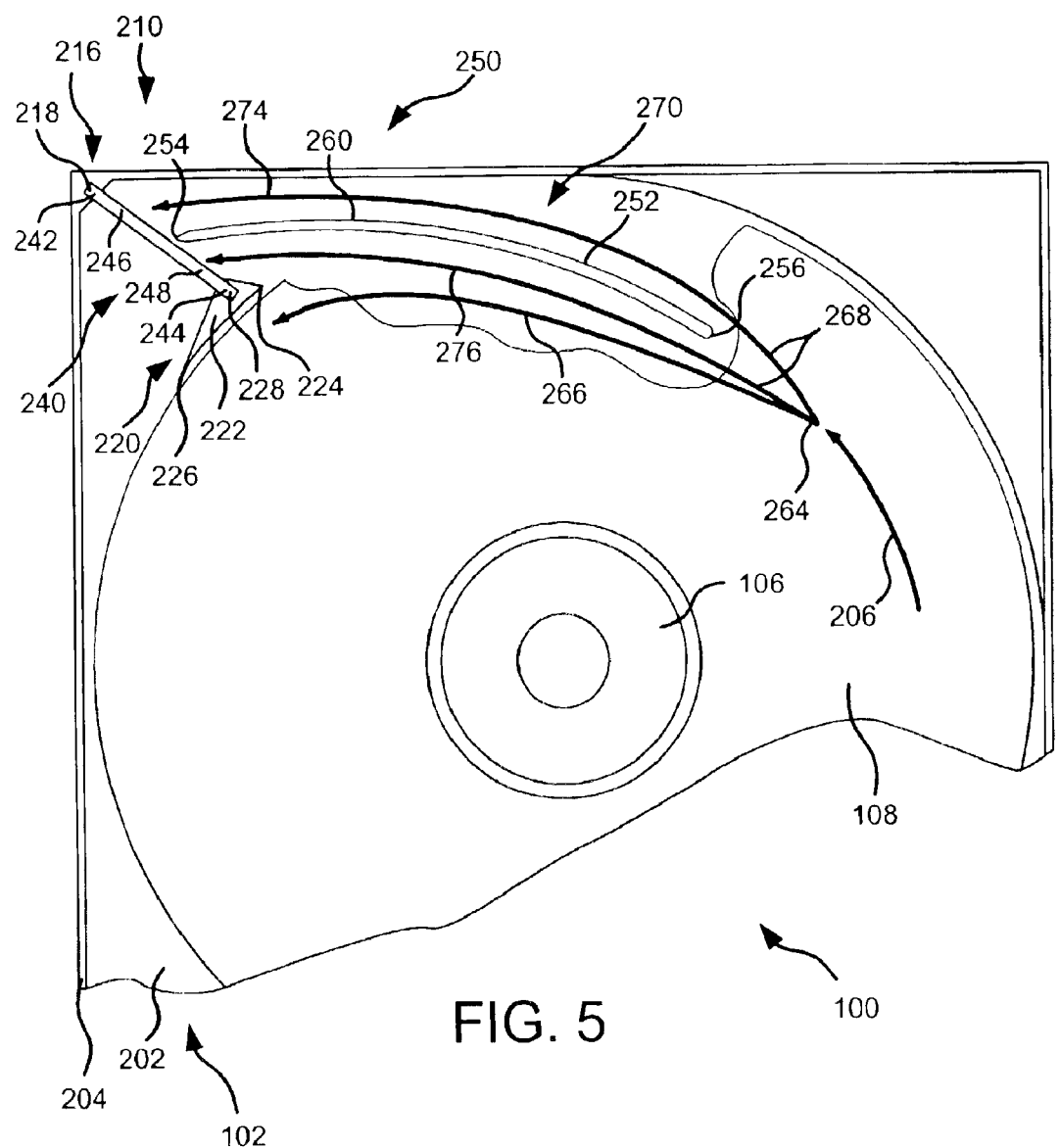
FIG. 5 is a cut away top plan view similar to FIG. 3, but showing a disc drive according to an alternative embodiment of the present invention.

FIG. 5 illustrates an embodiment similar to the embodiment of FIGS. 2–4 with the same reference numbers for similar features. The vane 252 of FIG. 5, however, is longer than the vane 252 of FIGS. 2–4. More specifically, the vane 252 curves from the trailing edge 254 to the leading edge 256 beneath the disc 108, which is shown partially cut away. Notably, the vane 252 could extend above the disc 108, or it could even extend both above and below the disc 108. It is thought that the longer vane 252 of FIG. 5 extending beneath or above the disc 108 may be even more effective than the shorter vane 252 of FIGS. 2–4 in channeling wind toward the filter 240 and minimizing turbulent flow upstream of the filter 240.

Figure 6:
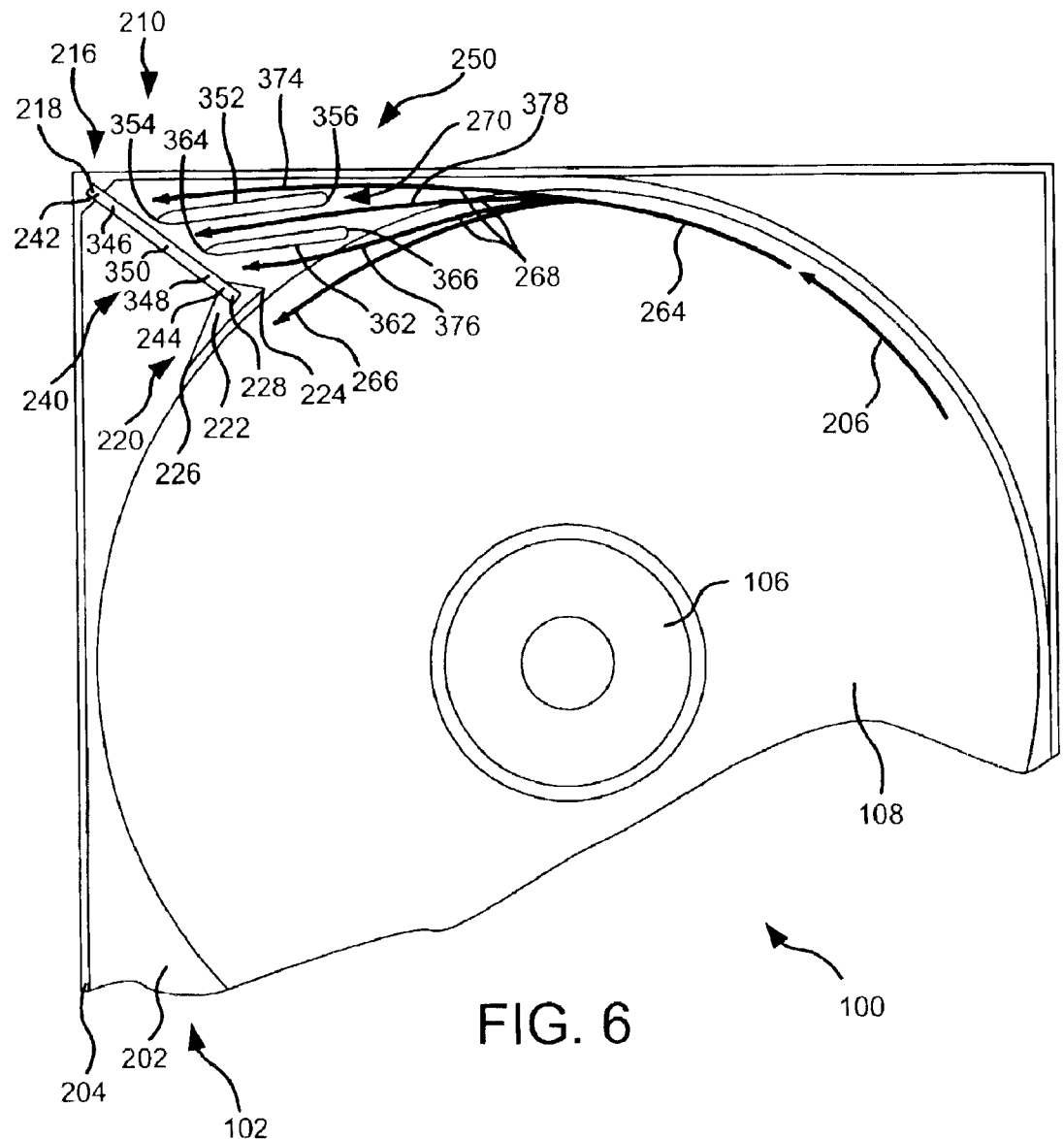
FIG. 6 is a cut away top plan view similar to FIG. 3, but showing a disc drive according to another alternative embodiment of the present invention.

FIG. 6 illustrates an alternative embodiment of a disc drive 100 similar to the embodiment described above, but including a flow divider 250 having multiple vanes. Reference numbers in FIG. 6 are the same as in FIGS. 2–4 for many similar features. The flow divider 250 of FIG. 6 separates the filter 240 into three filter zones, rather than two: an outer filter zone 346 adjacent the outer filter support 216, an inner filter zone 348 adjacent the inner filter support 220, and a middle filter zone 350 between the outer filter zone 346 and the inner filter zone 348. The outer filter zone 346, the middle filter zone 350, and the inner filter zone 348 preferably each cover about the same amount of area.

The flow divider 250 of FIG. 6 includes two vanes that are each similar to the vane 252 described above with reference to FIGS. 2–4. An outer vane 352 has a vertical trailing edge 354 adjacent the filter 240 that separates the outer filter zone 346 from the middle filter zone 350. The vane 352 extends upstream from the trailing edge 354 to a leading edge 356. The vane 352 preferably includes a base (not shown) secured to the bottom plate 202 of the disc drive base 102, as described above with reference to the vane 252. An inner vane 362 has a vertical trailing edge 364 adjacent the filter 240 that separates the middle filter zone 350 from the inner filter zone 348. The vane 362 extends upstream from the trailing edge 364 to a leading edge 366. The vane 362 preferably includes a base (not shown) secured to the bottom plate 202 of the disc drive base 102, as described above with reference to the vane 252. The vanes 352 and 362 are preferably substantially planar, although they may be curved as needed to properly redirect gaseous flow in different filter configurations. Also, the leading edges 356 and 366 of the vanes 352 and 362 are preferably positioned so that the flow rates through the outer filter zone 346, the inner filter zone 348, and the middle filter zone 350 are substantially the same.

The vanes 352 and 362 split the filter stream 268 into an outer branch 374 between the outer vane 352 and the outer wall 204, an inner branch 376 inside the inner vane 362, and a middle branch 378 between the outer vane 352 and the inner vane 362. The outer branch 374 flows through the outer filter zone 346, the inner branch 376 flows through the inner filter zone 348, and the middle branch 378 flows through the middle filter zone 350. It is believed that in some disc drive designs splitting the filter stream 268 into three narrower branches 374, 376, and 378 (FIG. 6) may be even more advantageous than splitting the filter stream 268 into only two branches 274 and 276 (FIGS. 2–3 and 5).

An embodiment of the present invention may be alternatively described as a disc drive (such as 100) that includes a housing (such as 103) enclosing a spindle motor (such as 106) that is able to spin a disc (such as 108). A filter (such as 240) within the housing is positioned so that a filter stream of moving gas (such as 268) created by a spinning motion of the disc flows through the filter. Additionally, a flow divider (such as 250) is secured to a portion of the housing and positioned within the filter stream upstream of the filter, splitting the filter stream into a first branch (such as 274) and a second branch (such as 276), both flowing through the filter.

Preferably, the first branch and the second branch are separate as they enter the filter, and the filter has a single filter element. In an embodiment where the housing includes a base (such as 102) and a cover (such as 104) the flow divider is preferably secured to the base. A bottom edge (such as 258) of the flow divider may be secured to the base and a top edge (such as 260) of the flow divider may be positioned adjacent to the cover. Also, the flow divider and the base may form a unitary aluminum member.

A first flow rate of the first branch is preferably substantially the same as a second flow rate of the second branch. Also, a trailing edge (such as 254) of the flow divider adjacent the filter may divide the filter into a first filter zone (such as 246) receiving the first branch and a second filter zone (such as 248) receiving the second branch, the first filter zone and the second filter zone each having substantially the same amount of filter area. The filter preferably extends in a substantially radial direction relative to the disc. Moreover, the flow divider may include a first vane (such as 354) separating the first branch (such as 374) of the filter stream from the second branch (such as 378) of the filter stream and a second vane (such as 362) separating the second branch (such as 378) of the filter stream from a third branch (such as 376) of the filter stream. Additionally, at least a portion of the flow divider may be positioned beneath or above the disc.

Stated another way, an embodiment of the present invention may be alternatively described as a disc drive (such as 100) that includes a housing having a base (such as 102) and a top cover (such as 104) secured to the base. The housing encloses a spindle motor (such as 106) spinning a disc (such as 108). A filter (such as 240) within the housing adjacent the disc is positioned so that a gaseous filter stream (such as 268) created by the spinning disc flows through the filter. Additionally, a first vane (such as 252) is secured to a portion of the housing and positioned within the filter stream upstream of the filter. The first vane splits the filter stream into a first branch (such as 274) and a second branch (such as 276), both flowing through the filter, wherein a first flow rate of the first branch is substantially the same as a second flow rate of the second branch.

Stated yet another way, an embodiment of the present invention may be alternatively described as a disc drive (such as 100) that includes a housing (such as 103) enclosing a spindle motor (such as 106) spinning a disc (such as 108), and a filter (such as 240) adjacent the disc. The filter is positioned so that a gaseous filter stream (such as 268) created by the spinning disc flows through the filter. The disc drive also includes means for minimizing turbulence in the filter stream upstream of and adjacent to the filter.

It will be clear that the present invention is well adapted to attain the ends and advantages mentioned as well as those inherent therein. While presently preferred embodiments have been described for purposes of this disclosure, various changes and modifications may be made which are well within the scope of the present invention. For example, the flow divider 250 may include even more than two vanes and the filter 240 may be located at different positions in the disc drive 100. Numerous other changes may be made which will readily suggest themselves to those skilled in the art and which are encompassed in the scope of the invention disclosed and as defined in the appended claims.

What is claimed is:

1. A disc drive comprising:
   a housing enclosing a spindle motor operable to spin a disc;
   a filter within the housing, wherein the filter is positioned so that a filter stream of moving gas created by a spinning motion of the disc flows through the filter; and
   a flow divider secured to a portion of the housing and positioned within the filter stream upstream of the filter, wherein the flow divider splits the filter stream into a first branch and a second branch, both flowing through the filter, and wherein the flow divider has a shape that increases the flow of gas through the filter.

2. The disc drive of claim 1, wherein the first branch and the second branch are separate as they enter the filter.

3. The disc drive of claim 1, wherein the filter compromises a single filter element.

4. The disc drive of claim 1, wherein:

the housing comprises a base and a cover; and the flow divider is secured to the base.

5. The disc drive of claim 4, wherein a bottom edge of the flow divider is secured to the base and a top edge of the flow divider is positioned adjacent to the cover.

6. The disc drive of claim 4, wherein the flow divider and the base form a unitary member.

7. The disc drive of claim 6, wherein the unitary member comprises aluminum.

8. The disc drive of claim 1, wherein a first flow rate of the first branch is substantially the same as a second flow rate of the second branch.

9. The disc drive of claim 1, wherein a trailing edge of the flow divider adjacent the filter divides the filter into a first filter zone receiving the first branch and a second filter zone receiving the second branch, the first filter zone and the second filter zone each having substantially the same amount of filter area.

10. The disc drive of claim 1, wherein the filter extends a substantially radial direction relative to the disc.

11. The disc drive of claim 1, wherein the flow divider comprises a first vane separating the first branch of the filter stream from the second branch of the filter stream and a second vane separating the second branch of the filter stream from a third branch of the filter stream.

12. The disc drive of claim 1, wherein at least a portion of the flow divider is positioned beneath or above the disc.

13. A disc drive comprising:

a housing comprising a base and a top cover secured to the base, the housing enclosing a spindle motor spinning a disc;

a filter within the housing adjacent the disc, the filter positioned to that a gaseous filter stream created by the spinning disc flows through the filter; and a first vane secured to a portion of the housing and positioned within the filter stream upstream of the filter, the first vane splitting the filter stream into a first branch and a second branch, both flowing through the filter.

14. The disc drive of claim 13, wherein the first branch and the second branch an separate as they pass through the filter.

15. The disc drive of claim 13, wherein the filter comprises a single filter element.

16. The disc drive of claim 13, wherein a bottom edge of the first vane is secured to the base and a top edge of the first vane is positioned adjacent the cover.

17. The disc drive of claim 16, wherein the first vane and the base form a unitary member.

18. The disc drive of claim 17, wherein the unitary member comprises aluminum.

19. The disc drive of claim 13, wherein a trailing edge of the first vane is adjacent the filter the divides the filter into a first filter zone receiving the first branch and a second filter zone receiving the second branch, the first filter zone and the second filter zone each comprising substantially the same amount of filter area.

20. The disc drive of claim 13, further comprising a second vane secured to the housing adjacent the first vane, the second vane separating the second branch of the filter stream from a third branch of the filter stream.

21. The disc drive of claim 13, wherein the first vane is curved and at least a portion of the first vane is positioned beneath or above the disc.

22. The disc drive of claim 13, wherein a first flow rate of the first branch is substantially the same as a second flow rate of the second branch.

23. A disc drive comprising:

a housing enclosing a spindle motor spinning a disc and a filter adjacent the disc, the filter positioned so that a gaseous filter stream created by the spinning disc flows through the filter; and means for minimizing turbulence in the filter stream upstream of and adjacent to the filter.

24. The disc drive of claim 23, wherein the means for minimizing turbulence comprises a van dividing the filter stream upstream of the filter into a first branch and a second branch, wherein the first branch and the second branch both flow through the filter.

25. The disc drive of claim 24, wherein:

the housing comprises a base and a cover; and the vane is secured to the base.

26. The disc drive of claim 25, wherein a bottom edge of the vane is secured to the base and a top edge of the vane is positioned adjacent to the cover.

27. The disc drive of claim 24, wherein a trailing edge of the vane is adjacent the filter and divides the filter into a first filter zone receiving a first stream and a second filter zone receiving a second stream, the first filter zone and the second filter zone each comprising substantially the same amount of filter area.

28. The disc drive of claim 24, wherein the first branch and the second branch are divided until they pass through the filter.

29. The disc drive of claim 24, wherein a first flow rate of the first branch is substantially the same as a second flow rate of the second branch.

* * * * *

UNITED STATES PATENT AND TRADEMARK OFFICE
CERTIFICATE OF CORRECTION

PATENT NO. : 7,057,850 B2
APPLICATION NO. : 10/186952
DATED : June 6, 2006
INVENTOR(S) : Yiren Hong et al.

It is certified that error appears in the above-identified patent and that said Letters Patent is hereby corrected as shown below:

Col. 7, Line 50, "and the second branch an separate;" should be --and the second branch are separate--

Signed and Sealed this

Third Day of June, 2008

JON W. DUDAS
*Director of the United States Patent and Trademark Office*